United States Patent [19]

Webb

[11] Patent Number: 5,073,979
[45] Date of Patent: Dec. 17, 1991

[54] REFLECTOR FOR INFRARED REMOTE CONTROL TRANSMITTER

[76] Inventor: Edward L. Webb, 1780 W. Missouri Apt. E10, Phoenix, Ariz. 85015

[21] Appl. No.: 529,637

[22] Filed: May 29, 1990

[51] Int. Cl.⁵ .................................... H04B 10/00
[52] U.S. Cl. ............................ 359/142; 341/176; 358/194.1; 359/180
[58] Field of Search ................ 455/603, 618, 151; 341/176; 358/194.1

[56] References Cited

U.S. PATENT DOCUMENTS

| | | | |
|---|---|---|---|
| 4,269,486 | 5/1981 | Shintani | 350/486 |
| 4,402,575 | 9/1983 | Jacobs | 350/486 |
| 4,560,244 | 12/1985 | Ackerman | 350/486 |
| 4,709,412 | 11/1987 | Seymour et al. | 455/603 |
| 4,809,360 | 2/1989 | Kraft | 341/176 |

FOREIGN PATENT DOCUMENTS

| | | | |
|---|---|---|---|
| 0051795 | 2/1989 | Japan | 455/603 |
| 0051796 | 2/1989 | Japan | 455/603 |

OTHER PUBLICATIONS

Zapit Advertisement, Popular Science, from Monster Cable Products, Feb. 1988.

Primary Examiner—Curtis Kuntz
Assistant Examiner—Kinfe-Michael Negash
Attorney, Agent, or Firm—Don J. Flickinger; Jordan M. Meschkow

[57] ABSTRACT

A reflective member, such as a mirror, is positioned at an oblique angle in front of the transmission window of an infrared remote control transmitter to allow infrared signals to be directed at a receiver without aiming directly at the receiver. The reflective member is mounted on a front panel which may be part of an add-on adapter secured to the front end of transmitter housing, and which may be adjustable in terms of length or angle of orientation relative to the top wall of the housing. Alternatively, the front panel may be an integral part of the transmitter housing.

3 Claims, 1 Drawing Sheet

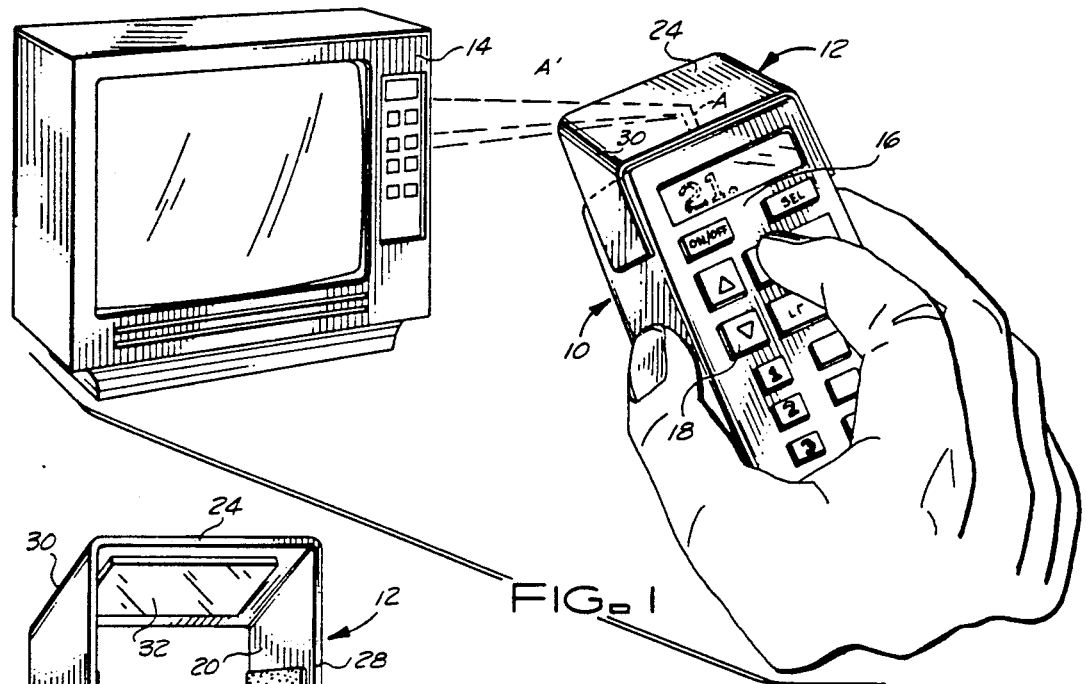
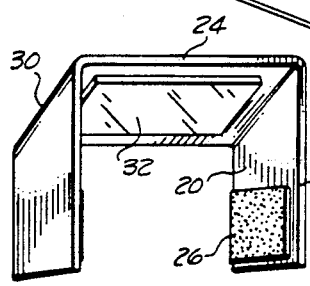
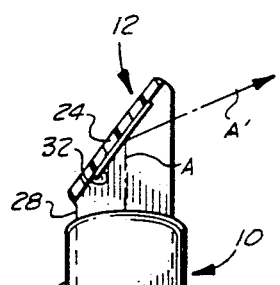
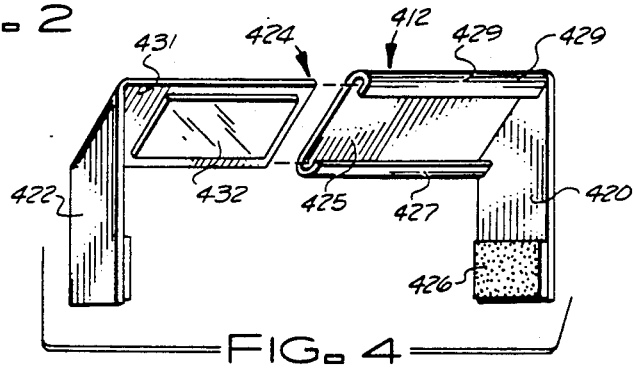
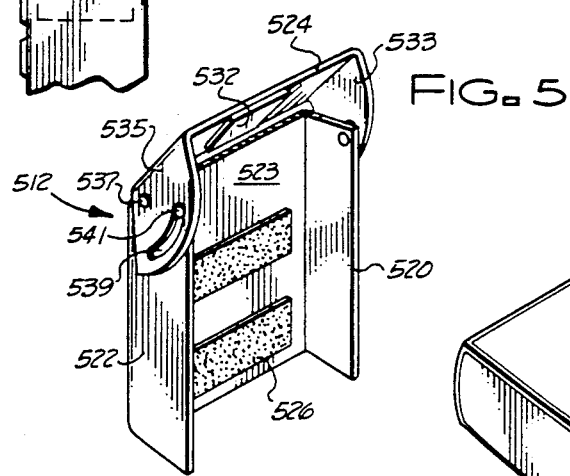
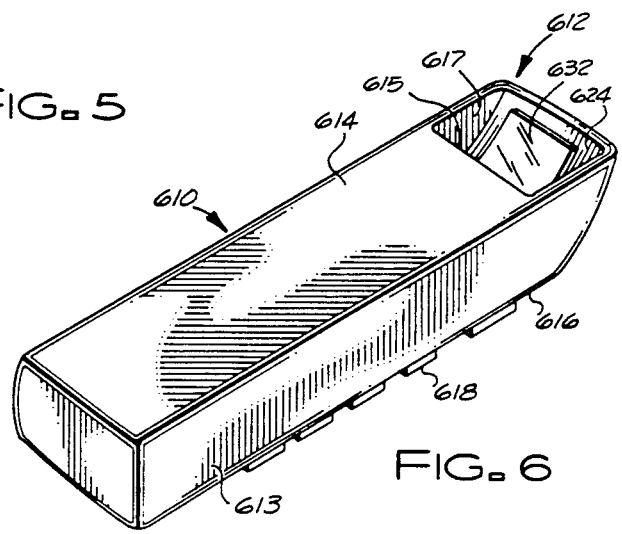

REFLECTOR FOR INFRARED REMOTE CONTROL TRANSMITTER

BACKGROUND OF THE INVENTION

1. Field of the Invention

This invention relates to the art of remote control devices.

More particularly, this invention relates to infrared remote control transmitters.

In a further and more specific aspect, the instant invention concerns a reflector mounted on an infrared remote control transmitter to enable a user to direct infrared signals toward an infrared controlled appliance without uncomfortable bending of the wrist.

2. Description of the Prior Art

The typical American household contains a number of audio and video appliances, such as televisions, video cassette recorders, laser disc players, and position controllers for satellite dishes. Many of these devices may be operated by portable remote control transmitters.

Most remote control transmitters are contained within compact, hand held housings having a number of keys corresponding to different functions such as television channels, volume control, and the like. By pressing a selected key, a user causes circuitry within the housing to produce a coded signal corresponding to that key. The signal exits the housing through a specially provided transmission window, and is directed toward a receiver which then decodes the signal and executes the associated commands.

The signals generated by remote control transmitters are generally in the form of either ultrasonic or infrared waves. Ultrasonic transmitters have one advantage in that they do not need to be pointed directly at the receivers for proper operation because the waves are capable of bouncing off walls and other surfaces until they reach their intended target. A disadvantage of ultrasonic transmitters is that if there are more than one ultrasonic controlled device in a household, they may interfere with one another, and a user may accidentally activate one device when intending to activate another.

The problem of interference is eliminated with infrared transmitters, since the beams emitted by such devices are fairly narrow and are not effective unless aimed directly into their receivers. However, many individuals find it difficult or uncomfortable to aim the transmitters as required. One reason for this difficulty is that the transmission window for the transmitter is typically located in the housing front wall, which is perpendicular to the top wall in which the control keys are mounted. Thus, an operator in a recumbent position can not simultaneously aim the device and look at the keys. Aiming the device becomes even more difficult if the operator's wrists are sore or immobilized due to injury or illness.

It would be highly advantageous, therefore, to remedy the foregoing and other deficiencies inherent in the prior art.

Accordingly, it is an object of the present invention to provide an improved infrared remote control transmitter.

Another object of the invention is the provision of a reflector for directing an infrared signal from a remote control transmitter to the receiver of an infrared controlled device without pointing the transmission window directly at the receiver.

And another object of the invention is to provide a reflective adapter which can be mounted on a conventional remote control transmitter.

Still another object of the invention is the provision of a reflective adapter of adjustable width which can be mounted on remote control transmitters of various sizes.

Yet another object of the invention is to provide a reflector which can be selectively pivoted to various angular orientations relative to the transmission window of an infrared remote control transmitter so that the transmitter can be operated from a number of different positions.

Yet still another object of the invention is the provision of a reflector which can be integrally constructed with an infrared remote control transmitter.

And still a further object of the invention is to provide a reflector for an infrared remote control transmitter, according to the foregoing, which is relatively inexpensive to manufacture and easy to use.

SUMMARY OF THE INVENTION

Briefly, to achieve the desired objects of the instant invention in accordance with the preferred embodiment thereof, a reflector is provided for an infrared remote control transmitter having a transmission window. The reflector comprises reflector means for receiving infrared signals from the transmitter and reflecting them toward an infrared appliance, and positioning means for positioning the reflector means at an oblique angle in front of the transmission window to direct the signals toward the appliance when the transmission window is not aimed directly at the appliance.

In a first embodiment of the invention, the positioning means is in the form of an adapter mounted on the front end of the transmitter housing. More specifically, the adapter comprises two side panels, each of which is adhesively mounted to one of the side walls of the housing, and a front panel which extends between the two side panels, forming an oblique angle with the top and front walls of the housing. The reflector means is in the form of a mirror mounted on the inner surface of the front panel, facing the transmission window.

In a variation of the first embodiment, the front panel comprises two planar members mounted for sliding movement relative to one another. This enables the length of the panel to be adjusted so that the adapter can be fitted on transmitters of various different widths.

In another embodiment of the invention, the adapter comprises a top panel which is adhesively mounted to the top wall of the transmitter, and a mirror-carrying front panel which is mounted for pivotable movement relative to the top panel. This allows the operator to select the angular orientation of the mirror relative to the transmission window so that the device can be used in a variety of positions.

In still another embodiment of the invention, the reflector is an integral part of the transmitter.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is a perspective view showing use of a remote control transmitter provided with a reflector according to the instant invention.

FIG. 2 is a perspective view showing the reflector of FIG. 1.

FIG. 3 is a side view, partially in section, of the transmitter and reflector of FIG. 1.

FIG. 4 is an exploded perspective view showing a variation of the reflector of FIG. 1.

FIG. 5 is a bottom perspective view showing a reflector according to an alternative embodiment of the invention.

FIG. 6 is a bottom perspective view of another embodiment of the invention.

DETAILED DESCRIPTION OF THE PREFERRED EMBODIMENT

Turning now to the drawings in which like reference characters indicate corresponding elements throughout the several views, attention is first directed to FIG. 1, which shows a conventional infrared remote control transmitter 10 fitted with a reflector 12 according to the instant invention. The transmitter 10 is shown here as a channel changer for a television set 14. However, the inventive concept may be applied with equal success to transmitters for other types of infrared controlled devices, such as video cassette recorders, laser disk players, and the like.

Transmitter 10 comprises a housing including a plurality of walls. The top wall 16 carries a number of control keys 18, which the operator presses to select various functions such as volume control or channel numbers. The front wall, obscured in the illustration by reflector 12, carries a transmission window (also obscured), through which infrared signals corresponding to keys 18 are emitted.

With additional reference now to FIGS. 2 and 3, reflector 12 is in the form of an adapter including a pair of parallel side panels 20, 22 and a front panel 24. An adhesive pad 26 or similar fastener is mounted on the inner surface of each side panel 20, 22 for securing the adapter to the front end of the transmitter housing. Each side panel 20, 22 includes a top edge 28, which extends parallel to the top wall 16 of the housing, and a front edge 30, which extends at on oblique angle to the top edge 28. Front panel 24 is coplanar with front edges 30, thus forming an oblique angle with both the top wall 16 and the front wall including the transmission window. The preferred angle of inclination is approximately 45 degrees. A mirror 32, or other reflective surface, is mounted on the inner wall of front panel 24.

The function of mirror 32 can be best understood by referring to FIGS. 1 and 3. In the absence of reflector 12, it is clear that any infrared signal emitted from transmitter 10 would travel in a forward, straight line path as indicated by dotted lines A. Thus, in order for the signals to reach the receiver of television set 14, it would be necessary for the operator to extend his or her hand in a straight position such that the bottom of the transmitter is approximately parallel to the floor. As a result, control keys 18 would face the ceiling, and would not be visible to the operator in a recumbent position. However, when reflector 12 is present, the infrared red signals strike mirror 32 and bounce off in the straight line path indicated by dotted lines A'. This enables the operator to direct signals at the television receiver while tilting the transmitter 12 housing in the position shown, so that keys 18 can be easily read.

One variation of the reflector according to the first embodiment is shown in FIG. 4. In this variation, reflector 412 includes a pair of side panels 420, 422 with adhesive pads 426, and a front panel 424 with mirror 432. Front panel 424 comprises a first planar member 425 secured to one of the side panels 420. The top and bottom edges of first planar member 425 are turned in to form a pair of longitudinally extending channels 427 and 429. A second planar member 431 is secured to the other of the side panels 422 and slidably received in channels 427 and 429. This allows the operator to adjust the effective length of front panel 424, so that reflector 412 can be adjusted to fit over transmitter housings of different widths.

Another embodiment of the invention is shown in FIG. 5. In this embodiment, the reflector 512 is in the form of an adapter having side panels 520, 522, top panel 523 and front panel 524 with mirror 532. Adhesive pads 526 are mounted on the bottom surface of top panel 523 for securing the reflector to the top wall of transmitter 10. Front panel 524 includes a pair of rearwardly projecting ears 533, 535 which are secured to side panels 520, 522 by pivot pins 537. Each ear includes a curved elongated slot 539 which slidably receives a locking pin 541 projecting from side panels 520 and 522. This arrangement enables the operator to rotate front panel 524 relative to top panel 523 and lock front panel in a selected angular orientation in accordance with his or her own preferences. If an operator prefers the straight-line operation of a conventional transmitter 10, he or she may simply pivot the front panel to a position coplanar with top panel 523, so that the infrared signals do not strike mirror 532.

In another embodiment of the invention, illustrated in FIG. 6, the reflector 612 is constructed as an integral part of the transmitter 610, rather than as an add-on adapter. This is done by extending the side walls 613, 617 and bottom wall 614 of the transmitter housing beyond the front wall 615, and by adding a front panel 624. Front panel 624 forms an oblique angle with respect to both front wall 615 and top wall 616, which carries control keys 618. A mirror 632 is mounted on the inner surface of front panel 624, which faces the transmission window of transmitter 610. An opening 617 is formed in bottom wall 614 of the housing, allowing infrared signals reflected off mirror 632 to travel through bottom wall 614 toward the receiver of an infrared controlled device when transmitter 610 is oriented with bottom wall 614 facing the appliance and the top wall 616 facing the operator.

Various modifications and variations to the embodiments herein chosen for purposes of illustration will readily occur to those skilled in the art. To the extent that such variations and modifications do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. An adapter for attachment to a housing of a remote control infrared transmitter for emitting infrared signals toward an infrared controlled appliance, the housing including a top wall,
a bottom wall, a pair of parallel side walls extending perpendicularly to said top and bottom walls, a front wall extending perpendicularly to the top, bottom and side walls, control means mounted in the top wall for controlling the infrared signals emitted by the transmitter, and a transmission window formed in the front wall for allowing the infrared signals to pass out of the transmitter, said adapter comprising:

a) reflector means for receiving infrared signals from the transmitter and reflecting said signals toward an infrared controlled appliance;

b) positioning means secured to said reflector means for positioning said reflector means in front of the transmission window and at an oblique angle to said front wall to direct the infrared signals toward the appliance when the transmission window is not aimed directly at the appliance, said positioning means including i) a pair of parallel side panels for attachment to the side walls of the housing, each of said side panels including a top edge for extending parallel to the top wall of the housing, and a front edge extending at an oblique angle to said top edge, and ii) a front panel coplanar with the front edges of said side panels, said front panel including an inner surface;

c) coupling means for securing said positioning means to the housing of the transmitter; and d) length adjustment means for varying the length of said front panel to correspond to the length of front wall of housings of different widths, said length adjustment means including i) a first planar member integrally secured to one of said side panels, said first planar member having top and bottom edges turned in to form a pair of longitudinally extending channels, and ii) a second planar member integrally secured to the other one of said side panels, said second planar member having top and bottom edges slidably received in said longitudinally extending channels.

2. The adapter according to claim 1 wherein said reflector means comprises a mirror mounted on the inner surface of said front panel.

3. The adapter according to claim 1 wherein said coupling means comprises adhesive elements on each of the side panels of said positioning means for attachment to the side walls of said housing.

* * * * *